United States Patent
Ellis et al.

(10) Patent No.: US 8,681,779 B2
(45) Date of Patent: Mar. 25, 2014

(54) TRIPLE PLAY SUBSCRIBER AND POLICY MANAGEMENT SYSTEM AND METHOD OF PROVIDING SAME

(75) Inventors: Stephen Edgar Ellis, Ottawa (CA); Manish Gulyani, Kanata (CA); Darren Helmer, Nepean (CA); Felix Katz, Nepean (CA); Gregory Francis Soprovich, Ottawa (CA)

(73) Assignee: Alcatel Lucent, Paris (FR)

( * ) Notice: Subject to any disclaimer, the term of this patent is extended or adjusted under 35 U.S.C. 154(b) by 521 days.

(21) Appl. No.: 11/788,780

(22) Filed: Apr. 20, 2007

(65) Prior Publication Data

US 2008/0056240 A1 Mar. 6, 2008

Related U.S. Application Data

(63) Continuation of application No. 11/514,679, filed on Sep. 1, 2006, now abandoned.

(51) Int. Cl.
*H04L 12/66* (2006.01)

(52) U.S. Cl.
USPC ............ 370/352; 370/252; 370/400; 370/401

(58) Field of Classification Search
USPC .................................. 370/252, 352, 400, 401
See application file for complete search history.

(56) References Cited

U.S. PATENT DOCUMENTS

| | | | |
|---|---|---|---|
| 2002/0023258 A1* | 2/2002 | Elwahab et al. | 717/122 |
| 2002/0052876 A1* | 5/2002 | Waters | 707/100 |
| 2003/0101243 A1* | 5/2003 | Donahue et al. | 709/220 |
| 2004/0210450 A1* | 10/2004 | Atencio et al. | 705/1 |
| 2005/0027851 A1* | 2/2005 | McKeown et al. | 709/224 |
| 2005/0091313 A1* | 4/2005 | Zhou et al. | 709/204 |
| 2005/0163242 A1* | 7/2005 | Ungerboeck | 375/261 |
| 2005/0253722 A1* | 11/2005 | Droms et al. | 340/572.1 |
| 2006/0050862 A1* | 3/2006 | Shen et al. | 379/219 |
| 2006/0161636 A1* | 7/2006 | Huber et al. | 709/218 |
| 2006/0233171 A1* | 10/2006 | Murray et al. | 370/390 |
| 2006/0271707 A1* | 11/2006 | Cheline et al. | 709/245 |
| 2006/0274668 A1* | 12/2006 | Franklin et al. | 370/252 |
| 2007/0005950 A1* | 1/2007 | Backman | 713/2 |
| 2007/0022211 A1* | 1/2007 | Shimizu et al. | 709/238 |
| 2007/0022469 A1* | 1/2007 | Cooper et al. | 726/3 |
| 2007/0097860 A1* | 5/2007 | Rys et al. | 370/229 |
| 2008/0025299 A1* | 1/2008 | Agarwal et al. | 370/389 |
| 2008/0279116 A1* | 11/2008 | Tuffin et al. | 370/254 |
| 2009/0138476 A1* | 5/2009 | Zimler et al. | 707/9 |

OTHER PUBLICATIONS

S. Alexander and R. Droms, IETF RFC 1533, DHCP Options and BOOTP Vendor Extensions, Lachman Technology, Inc., and Bucknell University, Oct. 1993, pp. 1-30.

M. Patrick, IETF RFC 3046, DHCP Relay Agent Information Option, Motorola BCS, Jan. 2001, pp. 1-14.

* cited by examiner

*Primary Examiner* — Kibrom T Hailu
(74) *Attorney, Agent, or Firm* — Ross D. Snyder & Associates, Inc.

(57) ABSTRACT

A system and method for simplifying management information discovery in a Triple Play provider network involves configuring an element management system (EMS) database to store DHCP information, and configuring the EMS to serve the information to a subscriber service controller or other operations support services component.

17 Claims, 3 Drawing Sheets

TRIPLE PLAY SUBSCRIBER AND POLICY MANAGEMENT SYSTEM AND METHOD OF PROVIDING SAME

CROSS-REFERENCE TO RELATED APPLICATIONS

This application is a continuation of U.S. patent application Ser. No. 11/514,679, filed Sep. 1, 2006, now abandoned.

MICROFICHE APPENDIX

Not Applicable.

TECHNICAL FIELD

The present invention relates in general to the provision of voice over Internet Protocol (VoIP), High Speed Internet and Video all delivered over the same communications network.

BACKGROUND OF THE INVENTION

FIG. 1 illustrates a portion of an exemplary prior art service provider network 20 for providing Triple Play services to service subscribers. A residential gateway (RG) in a service subscriber's residence 50 marks subscriber traffic before sending it off to a Digital Subscriber Line Access Multiplexer (DSLAM) 100 to which it is connected via a local loop 102. Typically, each of Voice over Internet Protocol (VoIP) traffic, television (TV) broadcast or video on demand (VoD) traffic, as well as high speed internet traffic are uniquely marked to distinguish each service from other traffic. Marking the traffic enables an Ethernet Service Switch 104 to provide proper quality of service (QoS) for each type of traffic and to direct each type of traffic to the appropriate systems in the network.

There is generally one residential gateway (RG) 106 and one DSLAM 100 port per service subscriber residence 50. When traffic exits through the DSLAM, a Virtual Local Area Network (VLAN) ID is assigned to each traffic flow from each subscriber. At the Ethernet Service Switch 104, one Service Access Point (SAP) 108 is provisioned per subscriber. The Ethernet Service Switch 104 divides the traffic into flows on a per subscriber basis according to the type of traffic and sends the traffic flows to their respective destinations (e.g., application servers 132 via service routers 130) in tunnels through the service provider network. A deep packet inspection (DPI) component 110 monitors traffic to detect viruses, monitor Quality of Service (QoS) per subscriber flow, and perform similar functions. The Subscriber Service Controller (SSC) 112 includes a Dynamic Host Configuration Protocol (DHCP) Server 114 for assigning Internet Protocol (IP) addresses to the RGs 106 at their request, and a Policy Manager 116 applies policies to the various Triple Play services and service subscribers.

Elements of the service provider network are managed using an Element Management System (EMS) 124, which stores network element information in an EMS database 126, in a manner known in the art.

The Triple Play subscriber and policy management system (SSC) 112 requires complete information about all resources used by a subscriber to provide monitoring and management of Triple Play Services for the subscriber. However, this information is scattered throughout multiple entities in the customer network and operations support system (OSS) 118—e.g. the RG (residential gateway) 106 used by the subscriber, the DSLAM 100 port assigned to the subscriber, the SAP (Service Access Point) 108 assigned to the subscriber, the aggregating Ethernet service switch 104 serving the subscriber, etc. Further compounding this problem is the number of subscribers that need to be supported, which can be up to 17 million subscribers per SSC 112.

Consolidating this information in the SSC requires complex software that is difficult to design, expensive to develop and must include modules to pull the information from other OSS components, such as a customer lightweight directory access protocol (LDAP) database, a subscriber provisioning system 122 and/or an inventory database.

Alternatively, it has been proposed that modules be developed in other OSS components to push required information to the SSC 112. Either approach, however, requires the development of almost $N^{**}2$ software modules to facilitate information exchanges between N OSS software components.

It is therefore highly desirable to provide a less complex way of capturing service topology information needed by a Subscriber Service Controller for IP address assignment, policy management, etc. in the provision of Triple Play services.

SUMMARY OF THE INVENTION

It is an object of the invention to provide a system and method for capturing service topology information needed by a Subscriber Service Controller to enable Triple Play residential gateway IP address assignment, Triple Play service subscriber policy management, etc.

The invention therefore provides a system for controlling, on a per subscriber basis, the delivery of Triple Play services via a data packet network, comprising: a Dynamic Host Configuration Protocol (DHCP) server; an element management system (EMS) having a database configured to store DHCP information about a subscriber rural gateway and digital subscriber line access module (DSLAM) used to provide the Triple Play services to the subscriber; and a Subscriber Service Controller (SSC) associated with the DHCP server, the SSC being configured to upload per-subscriber DHCP information periodically, or as required, from the EMS database, whereby the uploaded information is used to perform functions to control delivery of the Triple Play services.

The invention further provides a method of managing Triple Play service provision, comprising: configuring an element management system (EMS) database to store DHCP information about network elements used to provide Triple Play service to each service subscriber; and configuring a service subscriber controller to request the DHCP information from the EMS database and to use the information to perform functions to control delivery of the Triple Play services.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF PREFERRED EMBODIMENTS

The invention provides a method and system for utilizing the database of an Element Management System (EMS) to capture service topology information needed by a Triple Play Subscriber Service Controller (SSC). This is efficient from both an operational and implementation perspective because the EMS already communicates with Operational Support System applications, such as the Provisioning application. Consequently, the EMS already has at least a part of the information required to identify the residential gateway, DSLAM port, and service access port on a per subscriber basis for the SSC.

Figure 1:
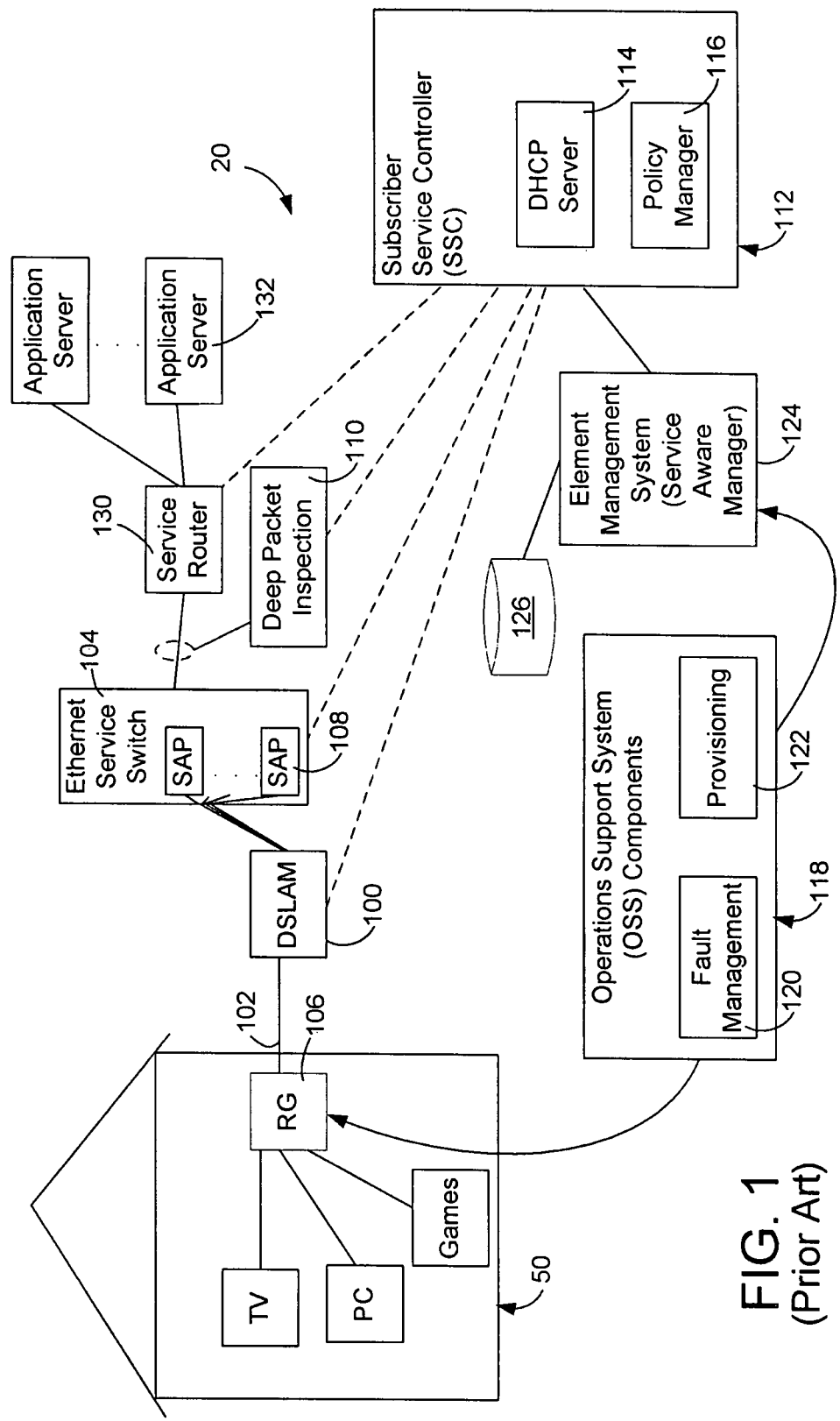
FIG. 1 is a schematic diagram of a prior art network configuration for providing Triple Play service to service subscribers.
Figure 2:
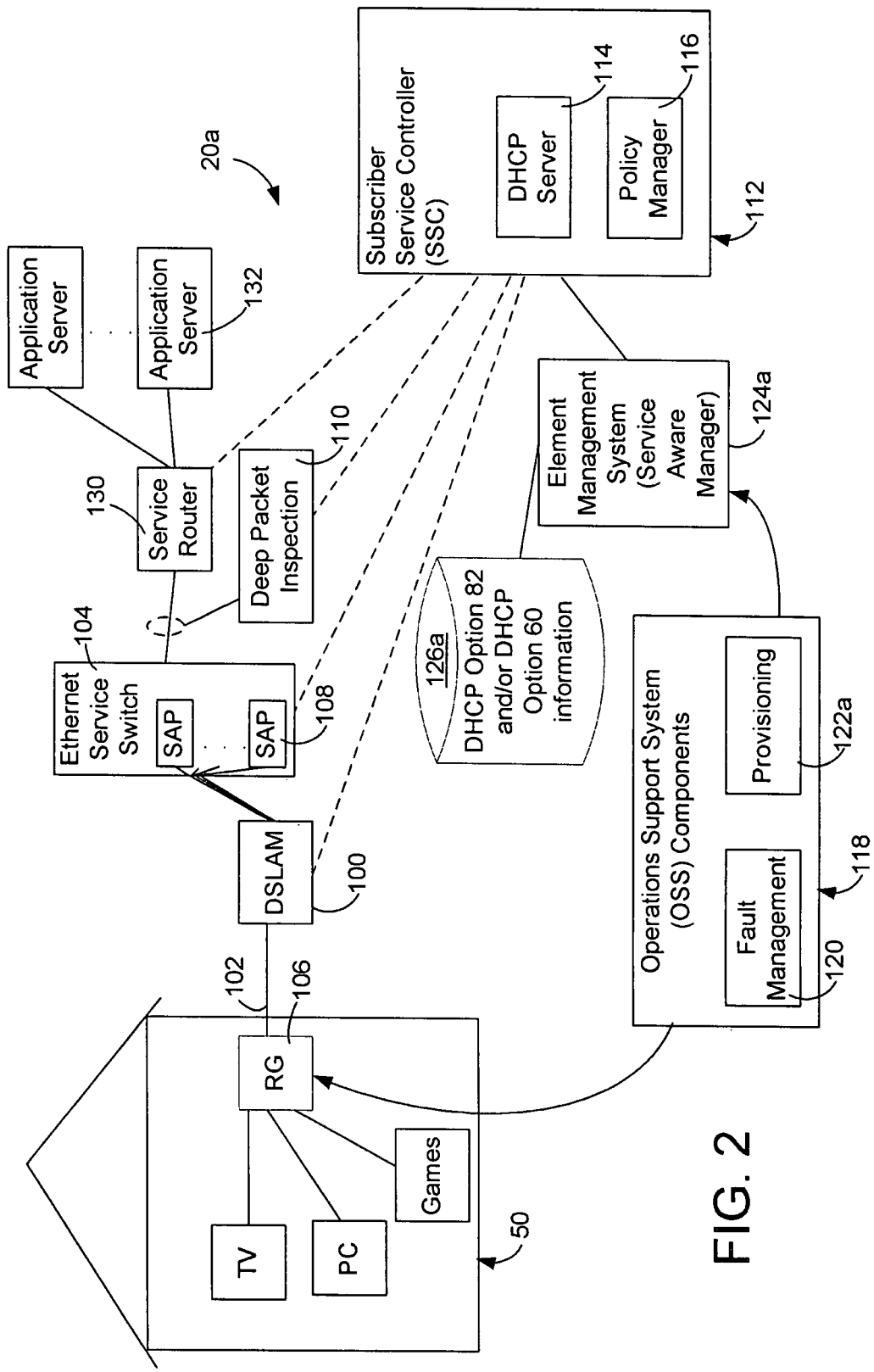
FIG. 2 is a schematic diagram of a network configuration in accordance with the invention for providing Triple Play service to service subscribers.

FIG. 2 is a schematic diagram of a service provider network 20a for providing Triple Play service in accordance with the invention. The service provider network 20a is similar to the service provider network 20 described above with reference to FIG. 1, except that a database 126a maintained by an Element Management System (EMS) 124a stores DHCP option 82 [RFC 3046] or DHCP option 60 [RFC 1533] information that is provided by the EMS 124a on demand by the SSC 112 or any other OSS 118 component.

Specifically, a provisioning application 122a is provisioned to store protocol information—e.g. the DHCP Option 82 information—in the EMS 124a database 126a to capture topological affinity of a SAP 108 to other network resources. The EMS 124a does not interpret this information in any way. The EMS 124a only serves the information to the SSC 112 on demand, thus providing the missing key for subscriber resources information without being aware of the service it is providing in doing so. The SSC 112 interprets this information to discover an associated Ethernet service switch 104 and a SAP 108 and related elements that provide service to the service subscriber.

Figure 3:
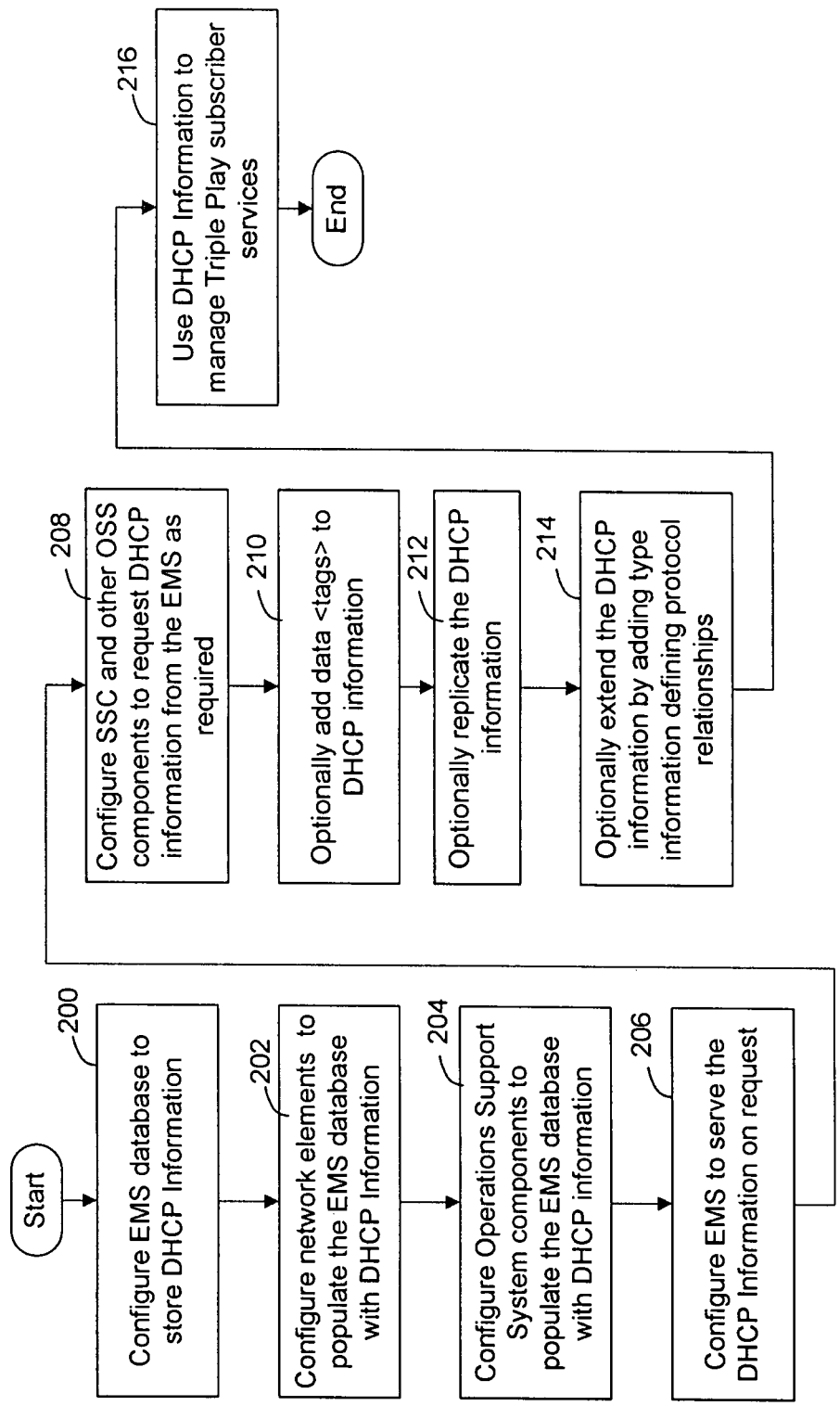
FIG. 3 is a flow chart illustrating principle steps in a method in accordance with the invention.

FIG. 3 is a flow chart further illustrating the invention and its application to the provision of Triple Play services to service subscribers. The EMS 124a database 126a is first configured to store DHCP information, in particular DHCP Option 82 information (200). Critical network elements are then configured to populate the EMS database with the DHCP information (202). OSS 118 components are also configured to populate the EMS database with DHCP information (204). Thereafter, the EMS 124a is configured to serve the DHCP information on request from the SSC 112, or another OSS 118 application (206). As explained above, the EMS 124a does not interpret in any way the DHCP information it stores and only serves it without awareness of the purpose of the DHCP information served.

The SSC 112 and other OSS components are then configured to request DHCP information from the EMS on an as needed basis (208).

The DHCP information data can be further extended using ordered partitioning or replication. In the case of partitioning, multiple relationship elements, called <Tags>, are separated for the use of discovering applications like the SSC 112 (210). Each protocol flow is associated with data within the data field and the <Tags> are used as keys for respective protocol flows. The protocol information is either implicit or encoded as part of the key.

In the replication case, the data field is simply repeated in multiple instances to achieve similar results (212).

The data field can be further extended by adding type information to the field for the purpose of simplifying discovery (214). In this case, the discovery process captures both the required data and the protocol relationships associated with the required data.

Thereafter, the network provider network uses the DHCP information to manage Triple Play subscriber services (216).

The invention will now be further described by the way of three specific examples.

Example I

The provisioning application 122a stores dynamic host configuration protocol (DHCP) Option 82 information as coded in the edge device (DSLAM 100, Ethernet service switch 104, etc) in the EMS 124a database 126a. The DHCP Option 82 information indicates the DSLAM 100 and port information within DHCP Option 82 sub options 1 & 2. A DHCP lease request contains the Option 82 information which the SSC 112 may combine with the local EMS 124a data to derive the Ethernet service switch 104, SAP 108 and DSLAM 100 information. This allows SSC 112 to perform policy actions upon either the SAP 104 or the DSLAM 100, as required, without data filling the SSC 112 with the information.

Example II

The EMS 124a database 126a can similarly be configured to store DHCP Option 60 information provided by the RG 106, a host or other device. This provides the SSC 112 with a means for discovering virtual interface to end point mappings.

For example, a RG 106 option 60 field can be data filled into the database 126a and used to identify the RG 106 to a next generation network architecture (TR59) compliant element management system (EMS).

As a further example, a RG 106 certificate can be data filled into the database 126a and used to relay 822.1×, Extensible Authentication Protocol (EAP) or similar port-based authentication methods back to the RG 106.

Example III

The method in accordance with the invention can be similarly used for any interface technology through the inclusion of a data field in the EMS database. Similarly, standard description fields available in many system interfaces such as Simple Network Management Protocol Interfaces Group-Management Information Base (SNMP IF MIB) can be leveraged for the purpose of linking protocol information to the EMS 124a for discovery by systems like the SSC 112.

Exemplary Application

An RG 106 in a subscriber's residence 50 requests an IP address from the DHCP Server 114 in the SSC 112. Since the DHCP Server 114 only has information about the SAP 108 that serves the service subscriber's RG 106, it must obtain information about the DSLAM 100 port, or optionally the RG 106 that sent the request, in order to determine a class of the subscriber before the IP address can be assigned. Consequently, the SSC 112 contacts the EMS 124 and uses existing DHCP information in the EMS database 126a to discover required information about the DSLAM 100 port, or the RG 106, respectively.

Although the present invention has been explained with specific reference to Triple Play services, the invention is applicable to assist discovery of any interface technology relationship: e.g., at the physical layer like Ethernet or HDLC, encapsulation-based like Asynchronous Transfer Mode (ATM) Permanent Virtual Circuit (PVC), Ethernet VLAN, virtual interfaces like sub-interfaces or SAPs, or tunnel interfaces like Multiprotocol Label Switching (MPLS), Generic Routine Encapsulation (GRE) or Layer 2 Tunneling Protocol (L2TP)—where it is desirable to relate the connectivity and network element associations for a system like the SSC 112.

The embodiments of the invention described above are therefore intended to be exemplary only. The scope of the invention is intended to be limited solely by the scope of the appended claims.

We claim:

1. A system for controlling, on a per subscriber basis, the delivery of Triple Play services via a data packet network, comprising:
    a Dynamic Host Configuration Protocol (DHCP) server;
    an element management system (EMS) having a database configured to store DHCP information about a subscriber rural gateway and digital subscriber line access module (DSLAM) used to provide the Triple Play services to the subscriber; and
    a Subscriber Service Controller (SSC) associated with the DHCP server, the SSC supporting a plurality of subscribers, the SSC being configured to upload per-subscriber DHCP information periodically, or as required, from the EMS database, whereby the uploaded information is used to perform functions to control delivery of the Triple Play services.

2. The system as claimed in claim 1 further comprising a service policy manager associated with the DHCP server the service policy manager being configured to upload per-subscriber DHCP information periodically, or as required, from the EMS database, to perform functions to control delivery of the Triple Play services.

3. The system as claimed in claim 1 wherein the EMS database is configured to store at least one of DHCP Option 82 information and DHCP Option 60 information.

4. The system as claimed in claim 1 wherein the EMS database is further configured to store DHCP Option 82 sub option 1 and 2 information.

5. The system as claimed in claim 1 wherein the EMS is configured to only serve the DHCP information.

6. The system as claimed in claim 1 further comprising network elements configured to pass DHCP information to the EMS for storage in the EMS database.

7. The system as claimed in claim 1 further comprising operations support services components configured to pass DHCP information to the EMS for storage in the EMS database.

8. A method of managing Triple Play service provision, comprising:
    storing, by an element management system (EMS) database, of Dynamic Host Configuration Protocol (DHCP) information about network elements used to provide Triple Play service to each service subscriber;
    and requesting, by a service subscriber controller (SSC) supporting a plurality of subscribers, the DHCP information from the EMS database and to use the information to perform functions to control delivery of the Triple Play services, wherein the storing and requesting are being performed by at least one processor or hardware.

9. The method as claimed in claim 8 further comprising configuring network elements to pass DHCP information to the EMS to populate the EMS database.

10. The method as claimed in claim 8 wherein storing, by the element management system (EMS) database, of the Dynamic Host Configuration Protocol (DHCP) information comprises configuring the database to store DHCP Option 82 information.

11. The method as claimed in claim 10 wherein configuring the database to store the DHCP Option 82 information further comprises configuring the EMS database to store DHCP Option 82, sub option 1 and 2 information.

12. The method as claimed in claim 10 further comprising configuring the EMS database to store DHCP Option 60 information.

13. The method as claimed in claim 10 further comprising adding data tags to the DHCP information.

14. The method as claimed in claim 10 further comprising replicating the DHCP information.

15. The method as claimed in claim 10 further comprising adding type information to the DHCP information to define protocol relationships used by the SSC for discovery.

16. The method of claim 11, wherein the requesting, by the SSC supporting the plurality of subscribers, the DHCP information from the EMS database and to use the information to perform functions to control delivery of the Triple Play services further comprises:
    deriving, at the SSC, edge device information based, at least in part, on the DHCP Option 82 information.

17. The method of claim 12, wherein the requesting, by the SSC supporting the plurality of subscribers, the DHCP information from the EMS database and to use the information to perform functions to control delivery of the Triple Play services further comprises:
    discovering virtual interface to end point mappings based on the configuring the EMS database to store DHCP Option 60 information.

* * * * *